United States Patent
Sweeny et al.

[15] 3,640,821
[45] Feb. 8, 1972

[54] REDUCTIVE DEGRADATION OF HALOGENATED PESTICIDES

[72] Inventors: Keith H. Sweeny, West Covina; James R. Fischer, Claremont, both of Calif.

[73] Assignee: The United States of America as represented by the Secretary of the Interior

[22] Filed: Dec. 23, 1970

[21] Appl. No.: 101,201

[52] U.S. Cl..............................................210/59, 260/649
[51] Int. Cl..........................................................C02c 5/02
[58] Field of Search .................................210/59, 63, 64, 50; 260/649 DD

OTHER PUBLICATIONS

Hornstein, I., use of granulated zinc columns, etc. J. Agr. Food Chem, Vol. 5, January 1957, pp. 37–39 (P.O.S.L.)

Faust, S. D., et al., Water Pollution by Organic Pesticides, J. AWWA, Vol. 56, Mar. 1964, pp. 267–279 (Copy in Gp. 176)

*Primary Examiner*—Michael Rogers
*Attorney*—Ernest S. Cohen and Roland H. Shubert

[57] ABSTRACT

Halogenated organic pesticides, typified by DDT, chlordane, lindane and the like, are reacted with metallic zinc under mildly acid conditions to produce less highly halogenated degradation products of lower toxicity.

6 Claims, No Drawings

REDUCTIVE DEGRADATION OF HALOGENATED PESTICIDES

BACKGROUND OF THE INVENTION

Most of the chlorinated organic compounds which are useful as pesticides are extremely stable. Consequently, they are persistent in the natural environment and quite severe reaction conditions are required for their rapid decomposition.

There are, however, a number of known techniques for decomposing pesticides such as DDT. For example, anhydrous aluminum chloride will partially dehydrohalogenate DDT. Sodium in liquid anhydrous ammonia will completely dechlorinate DDT while sodium reduction in refluxing isopropanol with subsequent titration of the chloride is a standard method of analysis for the compound.

Romano, writing in *Annali delli Sper. Agrar (Rome)*, 4, 1145–1157 (1950) reported that three of the five chlorine atoms of DDT may be reduced by refluxing an alcoholic-kerosene solution of DDT with ammonium sulfate and zinc metal. Hornstein, reporting in *J. Agr. Food Chem.*, 5, 37–39 (1957), found that chlorine content of DDT, dissolved in an acetone-dilute acetic acid mixture, was reduced by 50 percent in passing through a column of granulated zinc. He proposed the method as an analytical technique having a degree of specificity not available in analyses dependent upon total chlorine determinations.

While the prior art teaches a number of reaction methods to decompose DDT, none of these procedures are applicable to the detoxification of water or soil having low concentrations of pesticide. An important requirement of any feasible detoxification procedure is that major decomposition products be harmless to life forms. Additionally, the procedure should be economically feasible, should not employ difficult to obtain materials and should not result in the introduction of other harmful materials into the environment.

SUMMARY OF THE INVENTION

We have now found that chlorinated hydrocarbon pesticides present even in extremely dilute quantity in water or soil may be decomposed by contact with metallic zinc under acid conditions. The reaction proceeds at satisfactory rates at ambient temperatures but may be carried out at elevated temperatures as well. Degradation of p,p'-DDT by this technique yields bis(p-chlorophenyl) ethane as the major product.

Hence, it is an object of our invention to degrade halogenated organic pesticides.

It is a specific object of our invention to provide a process for the treatment of waste waters containing small concentrations of DDT.

DETAILED DESCRIPTION OF THE INVENTION

DDT is produced by reaction of chloral with monochlorobenzene in the presence of an acid-reacting condensing agent such as sulfuric acid or oleum. Purification of the crude DDT usually includes a water-washing step which produces wastes containing low concentrations, often in the range of about 100 to 1,000 p.p.m., of DDT. These wastes constitute a severe disposal problem since they cannot be directly treated by ordinary techniques applicable to the decomposition of DDT.

We have found that the DDT in such waste waters may be degraded to form less highly halogenated products of much less toxicity by contacting the wastes with zinc metal preferably in powdered form. Since the reaction requires a mildly acidic environment, many waste waters may be contacted directly with zinc as the only reagent. The reaction proceeds well at a pH within the general range of about 1.5 to 4. Many of the other chlorinated organic pesticides may be degraded in similar fashion.

Technical or commercial grade DDT typically consists of about 80 percent of the p,p'-isomer and about 20 percent of the o,p'-isomer along with small amounts (generally less than 1 percent) of a variety of other compounds. When DDT is decomposed by chemical reaction, it forms a number of degradation products, not all of which have been identified and characterized. The formula, structure and code designation of p,p'-DDT and of its major degradation products are as follows:

DDT 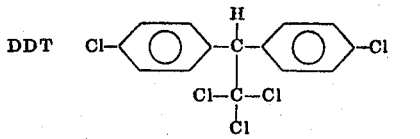

2,2 bis(p-chlorophenyl)-1,1,1-trichloroethane

DDD(TDE) 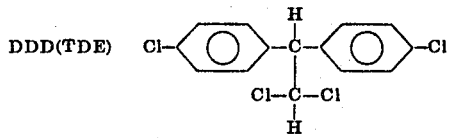

2,2 bis(p-chlorophenyl)-1,1-dichloroethane

DDMS 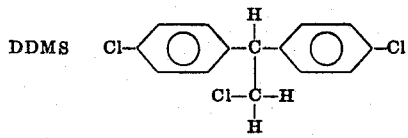

2,2 bis(p-chlorophenyl)-1-chloroethane

DDEt 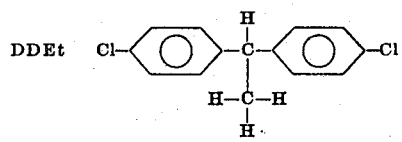

1,1 bis(p-chlorophenyl) ethane

DDE 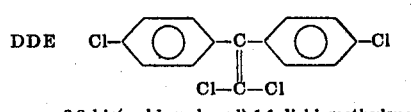

2,2 bis(p-chlorophenyl)-1,1-dichloroethylene

DDMU 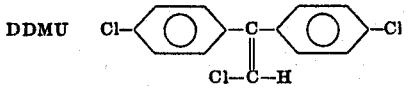

2,2-bis(p-chlorophenyl)-1-chloroethylene

Unless otherwise designated, the term DDT is used to refer to the principal isomer, p,p'-DDT. The degradation techniques apply equally well to the p,p'-isomer in which case equivalent o,p' isomers of the degradation products will be produced.

It has been recognized in the art that the neurotoxic and hepatotoxic effects of DDT are a function of the combination of aliphatic and aromatic halogens in the molecule. Compounds having only aliphatic or only aromatic halogens generally exhibit little toxicity and none of the central nervous system effects of DDT. While reproductive effects of DDT, exemplified by the so-called thin-shell syndrome, are imperfectly understood, this seems also to be related to the combination of aliphatic and aromatic halogens of the molecule. It is known that DDE, one of the degradation products of DDT, also will produce the thin-shell syndrome. Hence, in any practical process for disposal of DDT in wastes or in the environment, degradation products of DDT which are produced must be as harmless as possible.

Complete dehalogenation of compounds such as DDT is extremely difficult. Indications at this time are that removal of all of the aliphatic halogens, which produces the compound DDEt, results in a degradation product which is relatively harmless. DDEt is reported in the literature to be an effective acaricide but is from less than 0.001 to 0.06 as toxic as DDT to insects. It is also reported to be void of the neurotoxic effects of DDT and the LD$_{50}$ for rats (oral administration) is reportedly about 1,000 mg./kg. compared to about 150 mg./kg. for DDT.

In an effort to develop a system for the destruction of chlorinated pesticides in aqueous waste streams and in the natural environment, most of the known decomposition reactions were investigated. Analysis of the pesticides and degradation products was accomplished using a gas chromatography technique. A commercial gas chromatograph was equipped with a dual-flame detector in conjunction with an electron capture detector. The column used was ⅛-in. O.D. by 7 ft. long and was packed with 2 percent SE–30 (methyl silicone gum rubber) on Gas-Chrom Q (100–120 mesh). Argon was used as a carrier gas; injection block temperature was 165° C.; column temperature was programmed from 140° to 235° C. at a rate of 2° C./min. and sample volume was 1 μl. Standardization curves were prepared and retention times determined for a number of pesticides and possible degradation products using either commercially available or synthesized samples of the pure materials.

A summary of various approaches to the chemical degradation of DDT is presented in Table 1.

TABLE 1

| Reaction | Results |
|---|---|
| Lewis acids: | |
| AlCl₃, AlBr₃, FeCl₃ | Extensive degradation at 25, 50 and 100° C.; DDE a substantial product less effective than AlCl₃. |
| Clays, halide salts | Generally ineffective. |
| Free radical: | |
| Benzoyl peroxide | Complete conversion to DDE at 100° C.; little reaction at lower temperatures. |
| Other peroxide catalysts. | None effective at ambient temperature. |
| Redox system | Substantial conversion to DDE at 25° C. |
| Oxidation: | |
| Hot Chromic acid (117–120° C.) | Slow reaction, 40% DDT reacted in 8 hours. |
| KMnO₄ | Little reaction at 25° C. |
| Alkaline hydrolysis; KOH-ethanol. | Essentially complete conversion to DDE and other products at 78° C. |
| Reduction: | |
| Zn + dil acetic acid | Complete degradation of DDT without DDE as a product. Reaction proceeds at 25° C. |
| Zn + (NH₄)₂SO₄ | Degradation as with acetic acid but slower at 25° C. |

As a result of these screening tests, reduction of DDT and other pesticides with zinc metal was considered to be the most promising approach since cost of the reductant was relatively low, the reaction proceeded at ambient temperatures and the degradation products appeared to be comparatively low in the undesirable DDD and DDE compounds.

In Hornsteins method, DDT was reacted in a solvent comprising 2 parts acetone and 1 part 10 percent acetic acid giving a final acidity of 0.5 N. Since he reacted the dissolved DDT in a packed column, zinc was present in huge excess. A series of tests was carried out to more thoroughly characterize the zinc reduction and to determine whether the reaction would proceed at low zinc concentration.

The first experiment utilized pure p,p′-DDT and the acetone-acetic acid solvent system of Hornstein. Procedure was to dissolve 1 g. of DDT in 20 ml. acetone, add 1 g. zinc powder and acidify with 10 ml. of 10 percent acetic acid. The reaction mixture was maintained at 25° C. for 27 hrs. and periodic samples were taken for analysis. Results are as follows:

TABLE 2

| Component | Analysis, %, after reaction, hrs., at 25° C. | | | | |
|---|---|---|---|---|---|
| | ¼ | 1 | 2 | 3 | 27 |
| DDT | 7.7 | 6.5 | 2.1 | 1.4 | — |
| DDD | 16.2 | 23.2 | 21.0 | 19.9 | 17.3 |
| DDE | 11.2 | 5.9 | 2.5 | 2.3 | — |
| DDMS | 7.9 | 7.5 | 9.8 | 10.0 | 16.8 |
| DDMU | 18.8 | 13.6 | 15.5 | 20.0 | 16.2 |
| DDEt | 20.0 | 18.5 | 20.3 | 24.5 | 20.0 |
| unidentified | balance | | | | |

As the results show, substantially all of the DDT is reduced within the first 15 minutes. The small amount of DDE appearing early in the reaction is soon consumed while DDDE tends to be progressively reduced to DDMS. Additional tests in which reaction times were continued as long as 28 days confirmed these results. Concentration of DDD continued to decline with time while concentration of DDMS and of DDEt increased.

Effect of increased temperature was next investigated using the same reaction system as previously. A temperature of 40° C. was chosen as being a conservative simulation of summertime soil temperatures in the southern United States. Results of the tests are as follows:

TABLE 3

| Component | Analysis, %, after reaction, days at 40° C. | | | | | | |
|---|---|---|---|---|---|---|---|
| | 1 | 2 | 4 | 7 | 14 | 21 | 28 |
| DDT | — | — | — | — | — | — | — |
| DDD | 22.0 | 6.9 | 0.8 | 0.3 | — | 0.2 | 0.1 |
| DDMS | 40.6 | 51.4 | 55.8 | 55.8 | 55.5 | 54.5 | 53.0 |
| DDMU | 5.1 | 5.1 | 4.6 | 4.9 | 5.1 | 4.5 | 5.3 |
| DDEt | 31.1 | 36.0 | 38.3 | 37.5 | 37.5 | 39.3 | 39.6 |
| unidentified | balance | | | | | | |

DDE was not detected, even at the end of the first day of reaction. Another major effect of increased reaction temperature appears to be the more rapid and complete reduction of DDD to DDMS.

Effect of zinc concentration was next investigated using the same acetone-dilute acetic acid medium as was used previously. Results are as follows:

TABLE 4

| Component | Analysis, %, after 48 hr. reaction at 25° C. | | | |
|---|---|---|---|---|
| | g. Zn dust reactant/g. DDT | | | |
| | 1.00 | 0.50 | 0.25 | 0.10 |
| DDT | — | — | 29.8 | 67.8 |
| DDD | 39.4 | 51.7 | 46.7 | 18.4 |
| DDE | — | — | 1.7 | 3.8 |
| DDMS | 20.6 | 15.2 | 5.6 | 1.6 |
| DDMU | 4.4 | 4.3 | 2.4 | 1.3 |
| DDEt | 35.1 | 28.5 | 13.5 | 6.8 |

Stoichiometric considerations require a minimum of 0.276 g. zinc to reduce 1 g. DDT to the product DDEt. From the experimental results, it is apparent that an excess of zinc, at least about 0.5 g. per g. of DDT, is required for effective reaction. One interesting observation was that unconsumed zinc was found in all samples; even the one in which 0.1 g. zinc was used per g. of DDT.

The contribution of acetic acid to the reaction was next studied. In these tests, sulfuric and sulfurous acids were substituted for acetic acid in the acetone reaction medium previously used. Acidity of the reaction mixtures was 0.5 N in H₂SO₄ and 0.7 N in H₂SO₃. The following results were obtained:

TABLE 5

| Component | Analysis, %, after 24 hr. reaction at 25° C. | |
|---|---|---|
| | H₂SO₄ | H₂SO₃ |
| DDT | — | 33.3 |
| DDD | 41.2 | 45.6 |
| DDE | — | 4.1 |
| DDMS | 14.2 | — |
| DDMU | 4.9 | 3.4 |
| DDEt | 39.4 | 12.2 |

Substitution of sulfurous acid for sulfuric acid produced a much slower or less complete reaction.

One important application of any practical DDT degradative technique is in the treatment of effluent waters from the DDT manufacturing process. These wash waters usually have a DDT content in the range of about 100 to about 1,000 p.p.m., are usually acidic and typically have a discharge temperature of about 77° C. Since use of acetone as a reaction medium in treating such wastes is completely impractical, acidified aqueous samples of DDT were reacted with zinc metal. The samples were made up to contain approximately 420 p.p.m. of DDT and were acidified with sulfuric acid to a concentration of 0.018 N. This suspension was then reacted with zinc dust for 1 hr. at 75°–78° C. Results were as follows:

TABLE 6

| Component | Analysis, % |
|---|---|
| DDT | 3.8 |
| DDD+o,p'–DDT | 17.7 |
| DDMS | 8.6 |
| DDMU | 5.5 |
| DDEt | 63.0 |

As can be seen, substantially complete conversion of DDT was accomplished in the aqueous medium with the major degradation produced comprising the desired compound DDEt.

Next, tests were made to determine whether the zinc reduction of DDT could be accomplished in the presence of an organic soil mix. In these tests, three samples were compared. The first sample consisted of 1 g. zinc with 1 g. DDT in 30 ml. of the acetone-dilute acetic acid medium. In the second test, 1 g. of zinc, 1 g. of DDT and 10 g. of an organic soil mixture were reacted in the same solvent medium. The soil mixture was a commercial outdoor planting mix consisting of redwood humus and nitro humus sold under the trade name Kellogg Gro-Mulch. Sample No. 3 consisted of 1 g. DDT and 10 g. of the soil mix reacted in 30 ml. of the same solvent. All three samples were reacted at 25° C. for 24 hr. and were then analyzed. Results of the tests are as follows:

TABLE 7

| Component | Analysis, % | | |
|---|---|---|---|
| Reductant: | Zn | Zn + Soil | Soil |
| DDT | — | — | 89.6 |
| DDD | 34.1 | 38.4 | 3.5 |
| DDE | — | 0.4 | 6.4 |
| DDMS | 29.1 | 12.8 | 0.5 |
| DDMU | 5.8 | 6.4 | — |
| DDEt | 30.3 | 41.1 | — |

These tests showed that the degradation of DDT proceeded in approximately the same manner in the presence of the soil mix as it did without the organic material. The control sample, in which soil and DDT were reacted together, showed little degradation of the DDT.

The mildly acid reduction technique for degradation of DDT was then examined for its applicability to other chlorinated pesticides. First, three chlorinated hydrocarbons, Kelthane, Perthane and methoxychlor, which are structurally similar to DDT, were tested. Kelthane comprises 1,1-bis(para-chlorophenyl)-2,2,2-trichloroethanol while Perthane is based on 1,1-dichloro-2,2-bis(para-ethylphenyl) ethane. In all cases, 1 g. of the pesticide was reacted with 1 g. of zinc in the acetone-dilute acetic acid medium for 21–22 hours at 25°C.

Gas chromatographic analysis of Kelthane showed a major peak of 24.4 minutes with other minor components appearing at retention times of 9.8, 15.0, 18.4 and 20.8 minutes. Following treatment with the zinc reductant, the major peak disappeared as did the trace peak at 18.4 minutes. The small peak at 9.8 minutes decreased tenfold and the 20.8-minute peak increased sixfold. A major product peak appeared at 7.6 minutes which was tentatively identified as DDEt. Since Kelthane is a hydroxy-DDT, its degradation might be presumed to follow the same route as DDT. Another significant product peak was observed at 12.5 minutes and trace product peaks were observed at 6.5, 9.9 and 10.8 minutes.

Unreacted Perthane showed major peaks at 2.4, 15.3 and 17.3 minutes. After zinc reduction, the 2.4-minute peak disappeared and the other two major peaks decreased somewhat in size. A moderate peak at 19.6 minutes in the unreacted standard disappeared after reduction as did a minor peak at 12.6 minutes. Major product peaks which appeared showed response times of 6.4 and 7.3 minutes.

Methoxychlor showed a major peak at 25.7 minutes which was completely removed on zinc reduction with the formation of a product peak at 10.6 minutes. A moderate peak in unreacted methoxychlor, appearing at 20.7 minutes, was also removed completely while another moderate peak at 24.2 minutes was reduced to less than one-fourth its initial area. New product peaks also appeared at 19.3 and 22.0 minutes in the reacted sample.

A different type of chlorinated pesticide, lindane, which is an isomer of hexachlorocyclohexane, showed a major peak at 4.2 minutes and a minor peak at 1.5 minutes. After zinc reduction, both peaks disappeared.

Two chlorinated, cyclodiene pesticides, dieldrin, and chlordane, were reacted with zinc. Substantial reduction in area of the major peaks appearing in the chromatograms of these compounds was observed after reaction. Formation of new peaks, representing decomposition products was also observed.

Toxaphene is a chlorinated camphene having about eight chlorine atoms per camphene molecule. Its chromatographic curve is very complex with at least five major peaks. Upon reaction of toxaphene with zinc, all of the major peaks disappeared and a series of new peaks with substantially decreased retention times appeared.

These data show clearly that all of the chlorinated pesticides tested were substantially or completely degraded by zinc under the mild reaction conditions employed.

What is claimed is:

1. A method for the degradation of DDT which comprises reacting DDT with an aqueous suspension of finely divided metallic zinc at a pH below about 4 for a period of time sufficient to convert a major portion of the DDT to DDEt.

2. The method of claim 1 wherein the zinc is in powdered form.

3. The method of claim 2 wherein the acidity is supplied by sulfuric acid.

4. The method of claim 3 wherein said aqueous medium comprises a waste water from DDT processing.

5. The method of claim 4 wherein the DDT concentration in said waste water is less than about 1,000 p.p.m.

6. The method of claim 5 wherein the pH is maintained in the range of about 1.5 to about 4 during the reaction.

* * * * *